United States Patent

[11] 3,582,225

| [72] | Inventor | Florenz Joseph Hanzel<br>Cleveland, Ohio |
|---|---|---|
| [21] | Appl. No. | 769,948 |
| [22] | Filed | Oct. 23, 1968 |
| [45] | Patented | June 1, 1971 |
| [73] | Assignee | Republic Steel Corporation<br>Cleveland, Ohio |

[54] THREAD TAPPING MACHINE
10 Claims, 4 Drawing Figs.

[52] U.S. Cl. .................................................. 408/6,
10/139, 10/129
[51] Int. Cl. ...................................................... B23g 1/00
[50] Field of Search ........................................... 10/75, 129,
129 W.H., 129 B.W.H., 139, 139 W.H., 139
B.W.H., 135; 64/23, 23.6; 77/32.7, 33.3; 173/160;
175/321, 322

[56] References Cited

UNITED STATES PATENTS

| 1,592,009 | 7/1926 | Simpson.................... | 10/129 |
|---|---|---|---|
| 1,592,114 | 7/1926 | Leo........................... | 64/23 |
| 1,833,182 | 11/1931 | Safford..................... | 10/129 |
| 1,910,090 | 5/1933 | Clouse....................... | 10/129 |
| 2,051,086 | 8/1936 | Johnson..................... | 10/75 |
| 2,459,902 | 1/1949 | Tucker....................... | 77/32.7 |
| 2,849,733 | 9/1958 | Polis et al. ................. | 10/139 |
| 2,862,372 | 12/1958 | Weidner..................... | 64/23 |

Primary Examiner—Richard J. Herbst
Assistant Examiner—E. M. Combs
Attorneys—Robert P. Wright and Joseph W. Malleck ABSTRACT: A thread tapping machine includes a workpiece positioning structure, a tapping head including a tap support of a diametrical extent for reception of tapped articles, and a drive for advancing the tapping head toward and away from the work supporting structure. A pushrod structure transmits advancing forces to the tapping head. The pushrod structure is constructed so that the advancing forces transmitted are limited to a predetermined force to prevent overstressing of the tap support and related elements or breakage of the tap.

INVENTOR.
FLORENZ J. HANZEL
BY Watts, Hoffmann,
Fisher & Heinke
ATTORNEYS.

THREAD TAPPING MACHINE

BACKGROUND OF THE INVENTION

1. Field of the Invention

The present invention relates to machine tools and more particularly relates to tools for tapping threads in small articles on a quantity production basis.

Internal threads are generally formed by a tap which is rotated and advanced into a predrilled or preformed hole in a workpiece. Taps include a plurality of cutting edges which are successively engaged with a workpiece to progressively cut the threads. The cutting edges of such taps are disposed for cutting a helix having a prescribed lead. Accordingly it is necessary to advance the tap at a rate which corresponds to the rate of rotation of the tap in the hole.

When machinery is used to advance a tap through a workpiece, breakage of the tap often occurs when the machinery tends to advance the tap into the hole at a rate which does not correspond to the lead of the tap. Additionally in many cases the predrilled hole may be blocked by burrs or other obstructions or may include areas of hardened metal at the boundary of the hole. In these cases the tap may be bent or may break off as a result of excessive advancing forces exerted on it. Similarly when a dull tap is advanced into a hole the inefficient cutting of the teeth can result in excessive axial loadings and the tap may be bent or broken off. Further if there is no hole present or if the workpiece is misaligned or if the drilled hole is too small, tap damage will occur. When a tap is initially bent, breaking of the tap on subsequent operations is likely due to axial overloading as the bent tap is forced into the hole.

Tap breakage thus results from:
1. forcing a bent or misaligned tap into a workpiece;
2. blockage or absence of the drilled hole;
3. hard spots in the workpiece; 4. dull cutting teeth on the tap; and,
5. misaligned workpieces.

Breakage of taps under the enumerated circumstances is obviously an undesirable expense to the manufacturer of tapped articles. In manufacturing operations when articles, such as nuts, are produced in large quantities the losses from tap breakage alone has in the past run into tens of thousands of dollars. Down time due to tap breakage represents a considerable proportion of such losses in view of the lost production time.

When automatic tapping machinery is used, damage can occur even when taps are not broken. This damage is encountered when excessive advancing forces are exerted on the tap, causing overstressing and failure of parts of the machinery associated with the tap. 2. The prior Art The prior art has proposed some solutions to the problem of tap breakage. The basic concept proposed by the prior art is to provide a tap supporting assembly constructed of relatively movable parts, so that after a predetermined amount of resistance to cutting, the tap supporting assembly prevents further cutting.

One prior art proposal included the use of an overrunning clutch in the tap supporting assembly. When the tap afforded a predetermined amount of torsional resistance to movement, the clutch in the tap supporting assembly overran preventing further advancing of the tap.

Another proposal was to provide members which were threaded together so that when the tap met a predetermined amount of torsional resistance, relative rotation between the members occurred and axial advancing of the tap relative to the workpiece was prevented.

Still another prior art proposal was to provide a tap supporting member constrained for rotation with the tap and which included a spring and axially movable part to permit advancing of the tap supporting member axially relative to the tap when it encountered an obstruction.

All of the foregoing prior art proposals involved the use of machines for driving a tap in opposite rotational directions. In such operations the tap was advanced into the workpiece while rotating in one direction, cuts the threads, and was then rotated in the other direction to unthread the tap from the tapped hole.

The constructions referred to have in the main been relatively large in relation to the tap diameter and have been limited to use in conjunction with drill presses, lathes, boring machines, etc. where the tap assembly is chucked in the machine. As is pointed out presently, these constructions are not suitable for use in connection with tapping machines designed for large quantity production of tapped articles.

In some quantity production tapping machines a workpiece was rotated and advanced onto the tap so that the threads where cut and the workpiece was then advanced along the tap support which was small enough to freely extend through the tapped hole in the workpiece. In other machines the tap and tap support were rotated and advanced into the workpiece with the tap passing completely through the workpiece so that the tapped workpiece was received on the tap support. With these constructions there was no lost machine time in unthreading the tap from the workpiece, and the tapping machine was rapidly cycled.

Because of the relatively small tap supports used in these machines, yieldable tap supporting constructions of the type proposed in the prior art could not be used. Further, the tap support itself was of relatively low strength due to its necessarily small size and overstressing of the support as well as the tap occurred. The prior art did not propose a solution to the problem of tap breakage in such machines, or a solution of the additional problem of overstressing the tap support or related elements.

SUMMARY OF THE INVENTION

A tapping machine constructed in accordance with the present invention includes a tapping head structure having a tap rotatable in a single direction of rotation, a tap support for receiving tapped articles, a work supporting structure, and structure for moving the tap and work relatively so that the tap is advanced through the work.

To prevent overstressing of the tap and tap support the mechanism for moving the tap and the work together includes a motion transmitting linkage which is incapable of transmitting forces great enough to damage the tap, tap support, or other elements of the machine. The linkage is constructed of members which are resiliently biases into the desired spaced relationship to transmit advancing motion to the tap. If resistance to motion of the tap through the workpiece becomes large, the members of the linkage are deflected from the spaced relationship by increased advancing forces and further advancing of the tap under undesirably large advancing forces is prevented. In this manner excessive advancing forces are prevented from being applied to the tap or tap support.

In the tapping machine exemplified in the disclosure, the tap and tap support are rotated by a drive in the tapping head. The workpiece is stationary during tapping. The tapping head is cyclically move toward and away from the workpiece supporting structure by an advancing structure. The advancing structures includes a cam member and a pushrod linkage connecting the cam to the tapping head.

The pushrod has a pair of sleeves which define its end. The sleeves are telescoped over the ends of a body. The sleeves are slidable axially relative to the body. Springs are interposed between the body and the sleeve to bias the sleeves away from one another. These springs are so constructed and arranged that the pushrod structure firmly transmits advancing forces below a predetermined level from the cam member to the tapping head. More specifically the springs are in compression between the body and the sleeves and resist compression of the pushrod under normal conditions.

When the advancing forces are undesirably high the springs yield, resulting in relative movement of the sleeves toward each other so that the pushrod partially collapses to take up the motion transmitted by the cam. This motion would otherwise result in excessive advancing forces being applied to the tapping head. Thus forces of sufficient magnitude to damage the tap, tap support, or other relatively low strength elements in the tapping head are not transmitted.

Accordingly a principal object of the present invention is the provision of a new and improved automatic tapping machine wherein a tap, tap support, and other elements of the tapping head of the machine are protected against the application of unduly large forces thus minimizing tap breakage and overstressing of the elements of the machine.

Other objects and advantages of the present invention will become apparent from the following detailed description thereof made with reference to the accompanying drawings which form a part of the specification.

DESCRIPTION OF A PREFERRED EMBODIMENT

Figure 1:
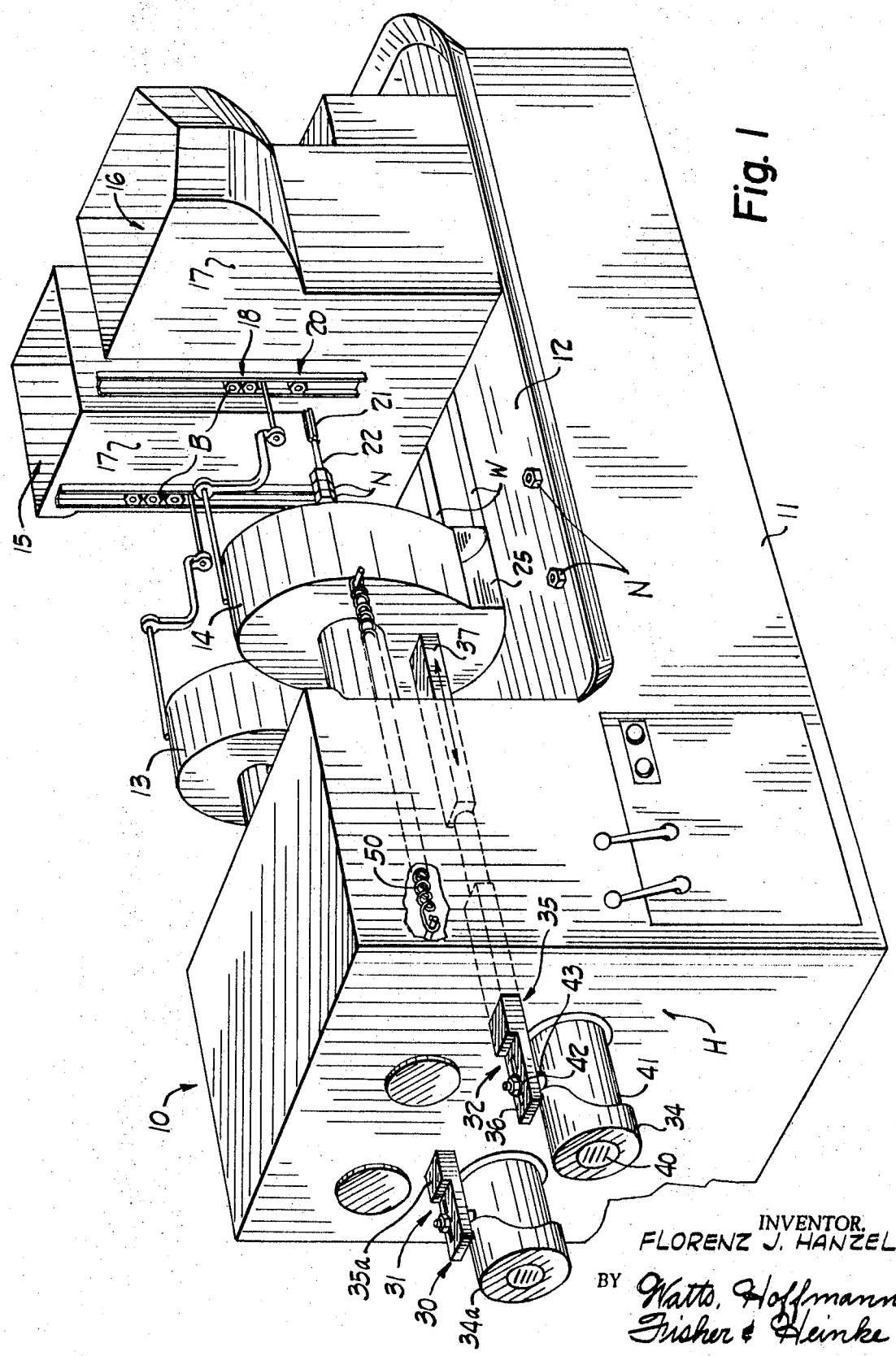
FIG. 1 is a schematic view of an automatic tapping machine embodying the present invention.

An automatic tapping machine 10 is shown in FIG. 1. The tapping machine 10 is known commercially as the "Nu-Tap" machine manufactured by Schuhl and Von Den Steinen, a German concern, which has been modified according to the invention. The machine 10 includes a base 11 and bed 12. The bed 12 supports a pair of tapping heads 13, 14 in side-by-side relation and a pair of work supporting structures 15, 16 spaced horizontally from the tapping heads 13, 14. The tapping heads 13, 14 are suitably disposed on ways W of the bed 12 for translational movement horizontally along the bed toward and away from the work supporting structures 15, 16.

Each of the work supporting structures 15, 16 includes a hopper 17 which, in the illustrated machine, is utilized to store a supply of nut blanks B which are to be tapped. The nut blanks B are fed from the hopper 17 into a guide structure 18. The nuts advance through the guide structure 18 to a tapping station 20. The support structure is constructed to accurately position a nut blank relative to its respective tapping head at the station 20. The tapping heads 13, 14 advance horizontally toward the station 20 and a tap 21 carried by each tapping head is advanced into a preformed opening in the nut blank in a manner which is described in greater detail presently.

Each tapping head 13, 14 includes a suitable drive (not illustrated) which is drivingly connected to a support 22 for the tap 21. The tap 21 and support 22 are fixed against relative rotation so that the tap is rotatably driven from the drive in the tapping head. The tap drive continuously rotates the tap in a single rotational direction during operation of the machine 10.

The tapping machine 10 is of the type known as a "bent shank" tapping machine. In such a machine the tapped nuts travel over a shank of the bent tap in a continuous flow and fall off the rear end of the shank into an exit chute 25. The tap support 22 is thus constructed and configured to receive and support tapped nuts which have been tapped and released from the station 20. Several tapped nuts N are illustrated and disposed upon the support 22 in FIG. 1.

The machine 10 includes a drive assembly shown generally at 30 for reciprocating the tapping heads along the ways W. This reciprocation of the heads advances the taps 21 into and through the nut blanks B, and withdraws tapped nuts N from the station 20 after tapping.

The drive 30 includes linkages 31, 32 associated with the tapping head structures 13, 14 respectively. The linkages 31, 32 include driven cams 34, 34a and pushrod assemblies 35, 35a. For clarity, during the balance of this disclosure, the push rod assembly 35 will be described in detail, it being recognized that the assembly 35a is identical.

The cams 34, 34a are of the "barrel cam" type. The cam 34 is mounted on a shaft 40 journaled for rotation about its axis. The cam 34 has a cam lobe 41 in the form of a circumferential shoulder.

The pushrod assembly 35 is disposed with its longitudinal axis lying parallel to the axis of rotation of the associated cam 34. The assembly 35 is slidably mounted in the housing H of the machine 10. The assembly 35 includes a cam or drive end 36 overlying the cam 34 and a head end 37 engaged with its associated tapping head. The cam end 36 of the push rod assembly 35 carries a cam follower 42 including a roller 43 which is disposed against the cam lobe 41.

Tension springs 50 are disposed between each of the tapping heads and the body 11 of the machine to maintain firm contact between the followers and the cam lobes and between the pushrod assemblies and the heads 13, 14. The springs 50 have spring rates which are less than the rate of return springs normally provided on the machine 10 for purposes which will become apparent presently.

As seen in FIG. 1 the cam lobe 41 is developed approximately along a sinusoidal path around the cam so that as the cam 34 is rotated about its axis the follower 42 and the pushrod assembly 35 is moved axially relative to the cam. The cam follower 42 is rigidly supported by the assembly 35 against radial movement relative to, or circumferential movement with, the cam 34.

During a revolution of the cam 34 the pushrod assembly 35 urges its tapping head 14 toward the associated work supporting structure 16 so that the rotating tap 21 passes through the opening in the nut blank B in the station 20. After the tap 21 has been advanced through a nut blank, the mechanism defining the tapping station 20 releases the nut and the tapping head 14 is moved away from the work supporting structure 16 by action of the spring 50. The tapped nut N is carried away from the station 20 on the support 22.

For reasons outlined previously, the taps are often bent and broken by prior tapping machines. Accordingly to the present invention this breakage problem is overcome because the pushrod assemblies 35, 35a are constructed so that advancing forces applied to the tapping heads 13, 14 are limited to a force which is insufficient to overstress the tap or associated elements of the tapping heads.

Figure 2:
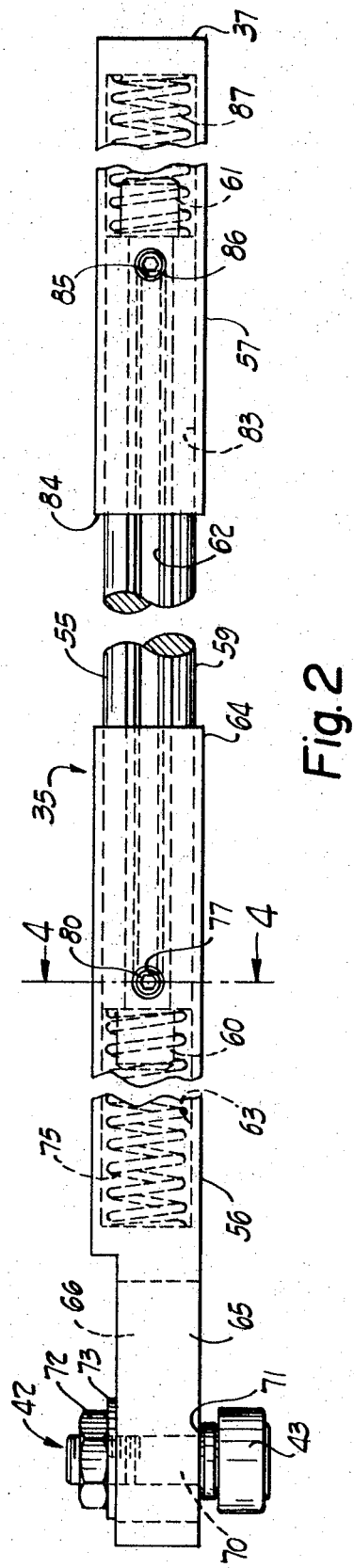
FIG. 2 is an elevational view of a pushrod structure of the tapping machine of FIG. 1 with portions shown in section.
Figure 3:
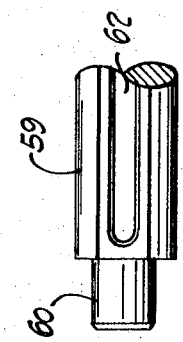
FIG. 3 is a sectional view as seen from the plane of the line 3-3 of FIG. 2.
Figure 4:
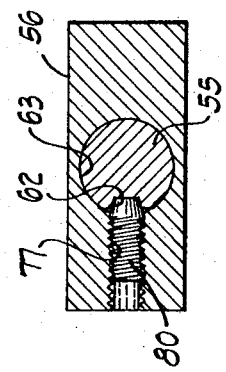
FIG. 4 is a fragmentary view of part of the pushrod structure of FIG. 2.

As is best seen in FIGS. 2 and 3 the pushrod assembly 35 includes a body member 55 and cam and head sleeves 56, 57. The sleeves 56, 57 are telescoped over and connected to the ends of the body. The body 55 has a cylindrical central portion 59 and end portions 60, 61 of reduced diameter. The central portion 55 has a longitudinal extending groove 62 which terminates adjacent the end portions 60, 61.

The cam sleeve 56 is of generally rectangular cross section and includes a cylindrical bore 63 extending axially from its body end 64. The cam sleeve 56 additionally includes an end portion 65. The end portion 65 is of rectangular cross section and includes a longitudinally extending slot 66 in which the cam follower 42 is mounted. The follower structure 42 is adjustable along the slot 66 to provide adjustment of the effective length of the pushrod assembly 35.

The roller follower 43 is rotatably mounted upon a threaded bolt 70 which extends through the slot 66. The bolt 70 has a shoulder 71 which abuts the underside of the cam end portion 65. The bolt receives a nut and washer 72, 73 which coact with the shoulder 71 to lock the cam follower structure 42 in an adjusted position on the cam end portion 65.

A compression spring 75 is disposed in the bore 63. The spring 75 is a helical coil spring having one end disposed about the end portion 60 of the body 55 and the other end in engagement with the bottom of the bore 63. The cam sleeve 56 additionally includes a threaded hole 77 extending through a sidewall of the sleeve. A stop screw 80 is threaded into the hole 77 and projects into the aligned groove 62. The stop screw 80 prevents the cam sleeve 56 and body 55 from becoming disassembled under the force of the spring 75.

The head sleeve 57 is of rectangular cross-sectional shape and is provided with a cylindrical bore 83. The bore 83 is open at an end 84 of the head sleeve and terminates near the head end 37. The sleeve 57 also includes a threaded opening 85 which receives a stop screw 86 that projects into the groove 62. The stop screw 86 maintains the sleeve 57 and body 55 in an assembled condition against the action of a helical compression spring 87 disposed in the bore 83 and over the end portion 61. The pushrod assembly 35 is effectively rigid upon the application of compressive forces along the pushrod which are less than the biasing forces of the spring 75, 87. Thus during normal operation of the machine 10 the advancing motion is transmitted from the cams 34, 34a to the tapping heads by the pushrods.

If the advancing movement of the tap into the workpiece is for some reason impeded, the sleeves 56, 57 are moved toward each other along the body 55 as the springs 75, 87 are compressed. This occurs when the advancing force between the cam 34 and tapping head increases to a first level sufficient to further compress these springs. The sleeves 56, 57 continue to move toward each other as the advancing cycle of the cam 34 continues, but further motion of the tapping head toward the work support structure is prevented due to the partial collapse of the pushrod. This is due to shortening of the pushrod assembly which, as noted, limits the force transmitted. Thus the pushrod assembly 35 is effective to limit the advancing force applied to the tapping head as well as to prevent further advancing movement of the tapping head when the tap meets a predetermined resistance.

After completion of the advancing cycle of the cam 34 the compressive force on the pushrod 35 is relieved and the sleeves 56, 57 move away from each and are returned to their FIG. 2 positions. The spring 50 is operative to return the tapping head to a retracted position. The relatively low rate of these springs minimizes the collapsing force applied to the pushrods by the return springs.

While the springs 75, 86 have been illustrated and in the form of helical compression springs, other forms may be employed having various desired spring rates and characteristics as long as the construction is such that the compressive forces transmitted by the pushrods 35 do not exceed the maximum force permissible on the weakest element on the tapping head.

Although a preferred embodiment of the invention has been described with a certain degree of particularity, it is understood that the present disclosure of this preferred form has been made only by way of example and that numerous changes in details of construction and arrangement of parts may be resorted to without departing from the spirit and the scope of the invention as hereinafter claimed.

Having described my invention I claim:

1. An automatic tapping machine comprising:
   a. a machine bed;
   b. a work supporting structure positioned on said bed for locating an article to be tapped;
   c. a tapping head supported on said bed for movement toward and away from said work supporting structure;
   d. said tapping head comprising:
      1. a tap rotatable relative to said work support station;
      2. a tap support receiving and supporting tapped articles;
      3. a tap drive connected to said tap for rotating said tap in a single direction; and,
   e. actuating means for moving said tapping head toward and away from said work supporting structure whereby an article supported by said work supporting structure is tapped and removed from said work supporting structure while supported on said tap support;
   f. said actuating means comprising a collapsible pushrod assembly extending between said tapping head and a driving member, said pushrod transmitting advancing force to said tapping head below a predetermined force and resiliently yielding under compression by said predetermined force to limit the stresses in said tapping head.

2. A machine as claimed claim 1 wherein said driving member of said actuating means comprises a movable cam member, said pushrod assembly including a cam follower member for engaging said cam member and transmitting advancing forces to said pushrod assembly and said tapping head.

3. A machine as claimed in claim 2 wherein said actuating means further comprises a return spring member connected between said tapping head and said bed, said return spring acting in opposition to said pushrod assembly for retracting said tapping head from said work supporting structure.

4. A machine as claimed in claim 1 wherein said pushrod extends generally parallel to the axis of rotation of said tap and is spaced laterally from said axis.

5. A machine as defined in claim 1 wherein said pushrod assembly includes a body member, first and second sleeve members disposed at opposite ends of said body member, and biasing means comprising a spring interposed between each end of said body and the respective sleeve member.

6. A machine as defined in claim 5 wherein said springs are normally compressed between said sleeve members and said body member, and said body and each of said sleeves are connected by structure preventing movement of said sleeve members away from the ends of said body and said springs.

7. For use in combination with a tapping machine having a stationary workpiece support, a tapping head structure including a rotatable tap, and a drive mechanism for moving said tapping head toward said work support to tap articles, a pushrod assembly between said tapping head structure and said drive mechanism to move said tapping head toward said work support in response to actuation by the drive mechanism, said pushrod assembly comprising:
   a. a central body member;
   b. a sleeve member having a cavity open at one end and of a cross-sectional dimension for receiving said body member;
   c. said sleeve member being telescoped over said body member such that an end portion of said body member is disposed within said sleeve member for movement axially relative to said cavity;
   d. a compression spring disposed within said cavity and interposed between the members;
   e. connecting means interposed between the members and maintaining the members in an assembled condition against the action of said spring, said spring being thereby maintained under compression; f. one of said members being a drive end member and including means for drivingly connecting said one member to said drive mechanism; and,
   g. tapping head advancing force transmitted between said members through said compression spring and to said tapping head, said pushrod assembly rigidly transmitting forces less than a predetermined force and said members moving relatively to further compress said spring when said predetermined force is applied whereby overstressing parts of said tapping head is avoided.

8. A device as set forth in claim 7 wherein said drive mechanism includes a rotatable cam member, and said connecting means includes a follower connected to said one of said members.

9. A device as defined in claim 8 wherein said follower is adjustably connected to said one member to permit the effective length of said pushrod assembly to be adjusted.

10. For use in combination with a tapping machine having a stationary workpiece support, a tapping head structure including a rotatable tap, and a drive mechanism for moving said tapping head toward said work support to tap articles, a pushrod assembly between said tapping head structure and said drive mechanism to move said tapping head toward said work support in response to actuation by the drive mechanism, said pushrod assembly comprising:
   a. a central body member;
   b. first and second spaced sleeves being telescoped over said body such that end portions of said body are disposed within said sleeves;

c. said sleeves each having a bottomed bore open at one end and a cross-sectional contour providing a surface for guiding the body for axial movement in said bore;
d. a pair of compression springs each disposed within one of said bores and interposed between an associated sleeve and the body; e. first and second connecting means interposed between the first sleeve and the body and the second sleeve and the body, respectively, and maintaining the body and sleeves in an assembled condition against the action of said springs, said springs being thereby maintained under compression;
f. one of said sleeves being a drive end sleeve and including drive transmitting means between said sleeve and said drive mechanism; and,
g. the other of said sleeves being a tapping head engaging sleeve for transmitting advancing force to said tapping head from said drive mechanism.

PO-1050
(5/69)

UNITED STATES PATENT OFFICE
CERTIFICATE OF CORRECTION

Patent No. 3,582,225            Dated     June 1, 1971

Inventor(s)     Florenz Joseph Hanzel

It is certified that error appears in the above-identified patent and that said Letters Patent are hereby corrected as shown below:

Column 1, line 50, "2. The Prior Art" should appear as a separate paragraph;

Column 2, line 46, "biases" should be "biased";

Column 2, line 57, "move" should be "moved";

Column 2, line 60, "end" should be "ends";

Column 6, line 45, "f. one of said members being a drive end member and including means for drivingly connecting said one member to said drive mechanism; and," should be a separate subparagraph;

Column 7, line 6, "e. first and second connecting means interposed between the first sleeve and the body and the second sleeve and the body, respectively, and maintaining the body and sleeves in an assembled condition against the action of said springs, said springs being thereby maintained under compression;" should be a separate subparagraph.

Signed and sealed this 11th day of January 1972.

(SEAL)
Attest:

EDWARD M. FLETCHER, JR.
Attesting Officer

ROBERT GOTTSCHALK
Acting Commissioner of Patents